United States Patent [19]

Anderson et al.

[11] 3,708,834
[45] Jan. 9, 1973

[54] STRETCH CLAMP

[75] Inventors: Charles B. Anderson, Spring Lake; William H. Tuggle, Jr., Nunica, both of Mich.

[73] Assignee: Atco Rubber Products, Inc., Grand Haven, Mich.

[22] Filed: Feb. 1, 1971

[21] Appl. No.: 111,569

[52] U.S. Cl. ................................................24/279
[51] Int. Cl. ............................................B65d 63/06
[58] Field of Search..............................292/307; 24/73 PB, 16 PB, 20 TT, 24/73 P, 279; 248/74 B 74 PB, 253, 367, 410, 420, 411

[56] References Cited

UNITED STATES PATENTS

| 1,505,883 | 8/1924 | Gleason | 24/279 UX |
| 2,208,859 | 7/1940 | Scott | 24/279 |
| 2,359,209 | 9/1944 | Ellinwood | 248/74 P B |
| 3,517,702 | 6/1970 | Mueller et al. | 24/16 P B UX |
| 3,565,375 | 2/1971 | Babb | 248/74 P B |

FOREIGN PATENTS OR APPLICATIONS

| 600,189 | 6/1960 | Canada | 24/279 |

Primary Examiner—Donald A. Griffin
Attorney—Price, Heneveld, Huizenga & Cooper

[57] ABSTRACT

A stretchable clamp as for hoses and the like, of an integral band of polymeric material with bosses protruding from one face and having aligned orifices to receive a threaded fastener.

2 Claims, 6 Drawing Figures

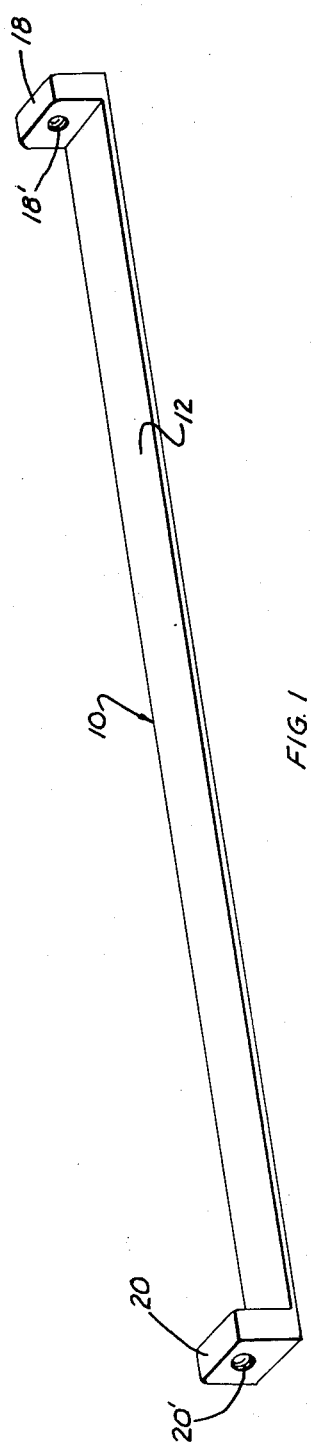
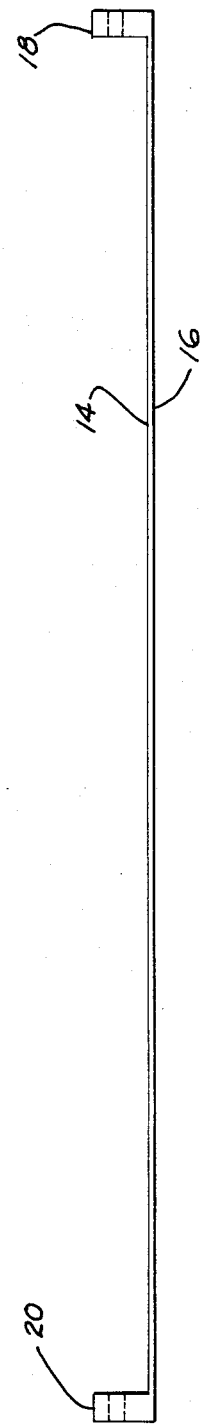

PATENTED JAN 9 1973

INVENTORS
CHARLES B. ANDERSON
WILLIAM H. TUGGLE JR.

BY

ATTORNEYS

STRETCH CLAMP

BACKGROUND OF THE INVENTION

This invention relates to clamps such as hose clamps, and more particularly to a polymeric band clamp.

Hose clamps of metal, while strong, are multi-component in nature, are relatively expensive to manufacture, do present sharp exposed edges, and are quite unsightly in appearance.

In some special instances, it has been possible to employ ratchet style bayonet polymeric fasteners instead of metal clamps. However, these have limited clamping capacity, tighten only along spaced increments of the ratchet teeth, and leave an exposed end dangling. Therefore, although metal clamps as for hose clamps often present distinct disadvantages, nothing commercially offered has been sufficiently effective to allow substitution thereof, even for air conducting conduits or the like.

SUMMARY OF THE INVENTION

This invention provides a novel polymeric stretch clamp which has a variable tightening capacity over a dimensional range. The clamp is moldable of one piece construction, except for a threaded fastener. It can be tightened to a final condition allowing the fastener bosses to be pulled up flush to each other, presenting an aesthetically appealing appearance. It has significant tensile strength, especially when stretched, to be effectively used as a hose clamp or the like.

BRIEF DESCRIPTION OF THE DRAWINGS

FIG. 1 is a perspective view of the novel stretch clamp;

FIG. 2 is a plan view of the clamp;

FIG. 3 is a side elevational view of the clamp;

DESCRIPTION OF THE PREFERRED EMBODIMENTS

Figure 4:
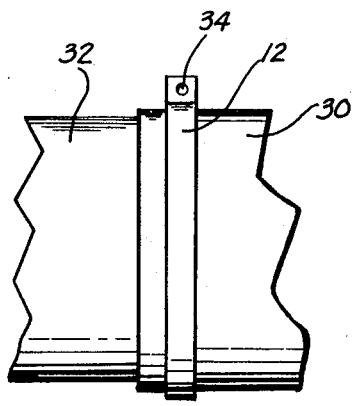
FIG. 4 is a fragmentary elevational view of the clamp in use.

Referring now specifically to the drawings, and particularly to the first modification illustrated in FIGS. 1-5, the novel stretch clamp 10 is an integral elongated band of generally uniform cross-section over its length, of a polymeric material, preferably an injection moldable polymeric material such as ABS rubber, polypropylene, polyethylene, polyvinyls or some suitable thermoplastic material well known in the art. The elongated band 12 has a pair of opposite faces 14 and 16 which are generally flat and parallel to each other. Adjacent the opposite ends of this elongated band, a pair of polymeric bosses protrude from one of the faces 14, these bosses 18 and 20 being integral with the polymeric band. In forming the band, these bosses are molded integral therewith. Each of these bosses has a fastener receiving orifice, 18' and 20' respectively, in the protrusions or bosses 18 and 20. When the band 12 is in a flat generally planar form as illustrated in FIGS. 1-3, these orifices are in alignment with each other, as well as being aligned generally parallel to the elongated dimension of the band. Bosses 18 and 20 also include a pair of abuttment faces 18a and 20a respectively on opposite ends of the band, facing outwardly of the band.

Figure 5:
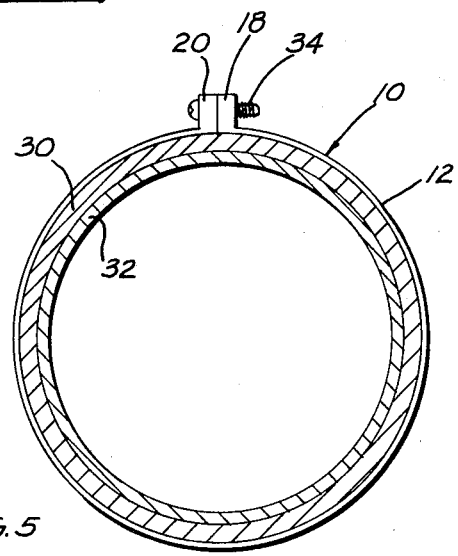
FIG. 5 is a sectional view taken through the apparatus in FIG. 4.

Polymeric band 12 has flexibility, enabling it to be configurated into a circular shape or configuration as illustrated in FIGS. 4 and 5 or into other curvalinear configurations to encompass the periphery of a device to be clamped. When configuration for attachment of the clamp, abuttment faces 18a and 20a face each other, with orifices 18' and 20' again being in alignment with each other.

The band 12 has strength to enable it to be tightened securely around the periphery of a hose, e.g., hose 30, fitted over a conduit such as 32, particularly when the band is stretched a controlled amount until faces 18a and 20a are in abuttment. Typically, the band will have dimensions of approximately three sixty-fourths of an inch thick and three-eighths of an inch wide. When applied around the hose and conduit, the threaded fastener fits loosely through orifice 20' and threadably engages orifice 18'. The threaded fastener or screw 34 may be a self threading unit, i.e., having the characteristic elongated notch such that orifice 18' need not be previously threaded but is dimensioned so as to be threaded with initial insertion of screw 34. The particular band clamp chosen for a particular installation is purposely of a length a friction of an inch shorter than the dimension around the hose periphery to be clamped. Then fasterer 34 is tightened until the clamp stretches a sufficient amount to place faces 18a and 20a into engagement with each other. This causes the band to stretch and therefore have a greater strength in retaining the assembly in engagement. It also causes the hose clamp to have an aesthetic appearance greatly improved over conventional hose clamps. No sharp edges are exposed. The color can be as desired to match the structure.

The novel clamp can be initially formed in a flat configuration and subsequently reformed into its curved configuration during use. Alternately, and it can be molded in a curved configuration.

Figure 6:
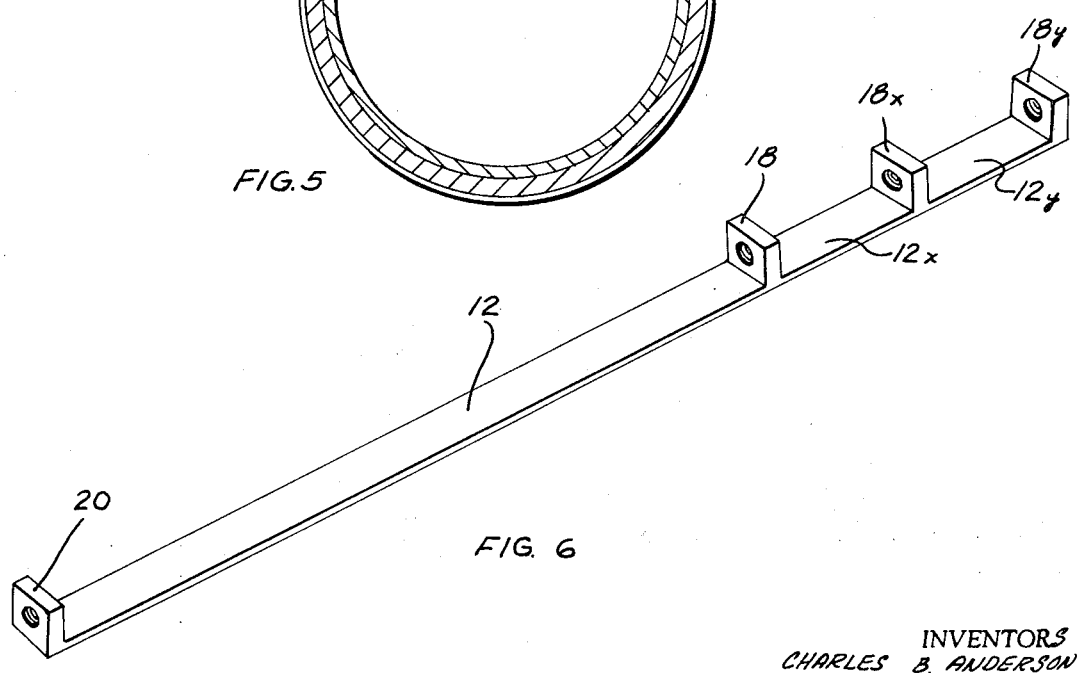
FIG. 6 is a perspective view of a modified form of the novel stretch clamp.

Utilizing the invention, the modified form in FIG. 6 can also be provided. Since the method of molding the clamp is relatively inexpensive, and since the materials forming it are also relatively inexpensive, the clamp can be formed of any desired length, with any desired number of spaced bosses, e.g., 20 on one end, and 18, 18x and 18y on the other end of the band, to enable the purchaser to obtain one clamp which can accomodate several different size hoses or the like. If only bosses 18 and 20 are needed for example, the remainder of the plastic band and spaced bosses can simply be cut off with a jack knife, a pair of scissors, or the like. Specifically, if the purchaser merely wishes a clamp of the length to include bosses 18 and 20, he would simply cut off band extensions 12x and 12y as well as protrusions 18x and 18y. Alternately, only extension 12y and protrusion 18y could be removed if this is desired.

This modified device subsequently functions in the same way as explained relative to the first embodiment.

It is also conceivable that certain additional details of the structure may be modified without departing from the concept presented. Hence, the invention is intended to be limited only by the scope of the appended claims and the reasonable equivalents to those defined therein rather than to the specific preferred embodiments shown as illustrative.

The embodiments of the invention in which an exclusive property or privilege is claimed are defined as follows.

1. A stretch clamp as for clamping hoses, comprising: an integral elongated band of polymeric material having a pair of opposite faces; said band having flexibility enabling it to be oriented in a generally flat configuration and into a curvalinear configuration, for wrapping it around hoses and the like; polymeric bosses protruding from one of said faces, adjacent opposite ends of said band, and integral therewith; said bosses being generally adjacent each other when said band assumes a curvalinear configuration; said bosses each having a fastener-receiving orifice extending therethrough, generally aligned with said elongated band and with each other; and said band having a thin cross section allowing limited elastic stretching expandability along its length under tension to enable it to be tightened securely around the periphery of a hose.

2. The clamp in claim 1 including one of said bosses adjacent one end, a second of said bosses adjacent the opposite end and at least one addition boss integral with said band and spaced from said one boss toward said second boss.

* * * * *